United States Patent
Larsson et al.

(10) Patent No.: US 8,806,021 B2
(45) Date of Patent: Aug. 12, 2014

(54) METHODS, PORTABLE ELECTRONIC DEVICES, SYSTEMS AND COMPUTER PROGRAM PRODUCTS FOR AUTOMATICALLY CREATING SOCIAL NETWORKING SERVICES (SNS)

(75) Inventors: Bo Larsson, Malmo (SE); Henrik Bengtsson, Lund (SE); Bjorn Lindquist, Bjarred (SE); Markus Andreasson, Lund (SE); Per Astrand, Lund (SE); Olivier Moliner, Lund (SE)

(73) Assignees: Sony Corporation, Lund (SE); Sony Mobile Communications AB, Lund (SE)

( * ) Notice: Subject to any disclaimer, the term of this patent is extended or adjusted under 35 U.S.C. 154(b) by 1744 days.

(21) Appl. No.: 12/020,905

(22) Filed: Jan. 28, 2008

(65) Prior Publication Data

US 2009/0193124 A1    Jul. 30, 2009

(51) Int. Cl.
*G06F 15/173* (2006.01)
*H04L 29/08* (2006.01)
*G06Q 10/10* (2012.01)
*H04L 12/18* (2006.01)

(52) U.S. Cl.
CPC .............. *G06Q 10/10* (2013.01); *H04L 67/14* (2013.01); *H04L 12/1818* (2013.01); *H04L 67/02* (2013.01)
USPC ........................................................ 709/227

(58) Field of Classification Search
USPC ................................................ 709/227, 229
See application file for complete search history.

(56) References Cited

U.S. PATENT DOCUMENTS

2007/0055500 A1* 3/2007 Bilobrov ....................... 704/217
2007/0124756 A1* 5/2007 Covell et al. .................... 725/18

FOREIGN PATENT DOCUMENTS

WO    WO 00/39978        7/2000
WO    WO 2005/079499 A2  9/2005

OTHER PUBLICATIONS

Fink, et al., "Social- and Interactive-Television Applications Based on Real-Time Ambient-Audio Identification," Center for Neural Computation, Hebrew University of Jerusalem and Google Research, Google Inc., Admitted Prior Art, 10 pgs.
International Search Report and Written Opinion (13 pages) corresponding to International Application No. PCT/IB2008/055448; Mailing Date: Jul. 20, 2009.

* cited by examiner

*Primary Examiner* — Scott Christensen
(74) *Attorney, Agent, or Firm* — Myers Bigel Sibley & Sajovec

(57) ABSTRACT

Methods, portable electronic devices, systems and computer program products are provided for automatically creating a social networking service (SNS) session. The methods include generating at and transmitting from a first device a first audio and/or video fingerprint of an audio and/or video event. The first audio and/or video fingerprint has a first predetermined length (T). A second audio and/or video fingerprint is periodically transmitted to a server from the first device. The second audio and/or video fingerprint has a second predetermined length (t), smaller than the first predetermined length (T), and includes data associated with the audio and/or video event that is later in time than data included in the first audio and/or video fingerprint. The first device is joined to an SNS session, automatically created by the server, responsive to receipts at the server, of a third audio and/or video fingerprint having the first predetermined length (T) from a second device that includes a portion of the first audio and/or video fingerprint or the second audio and/or video fingerprint periodically transmitted from the first device.

28 Claims, 5 Drawing Sheets

METHODS, PORTABLE ELECTRONIC DEVICES, SYSTEMS AND COMPUTER PROGRAM PRODUCTS FOR AUTOMATICALLY CREATING SOCIAL NETWORKING SERVICES (SNS)

FIELD OF THE INVENTION

The present invention relates to communications, and, more particularly, to social networking services (SNS) and related methods, devices, systems and computer program products.

BACKGROUND OF THE INVENTION

Recently, social networking services (SNS), for example, online chat rooms, internet forums and bulletin boards, instant messaging and the like, have become increasingly prevalent. Social networking services such as these enable people having similar interests, for example, sports, music, babies, politics and the like, to rendezvous in virtual communities. Typical, a user creates the virtual community, for example, an online chat room or bulletin board, and defines its context, for example, rock music. Virtual communities may also be set tip to discuss ongoing events, for example, concerts, television, shows, sporting events and the like. In particular, a user can set up an online chat room to discuss an ongoing football game, or create an online forum where people can comment on a beauty contest currently being shown on television. Thus, the emergence of virtual communities may allow users to communicate with others having like interests without leaving the comfort of their home or office.

SUMMARY OF THE INVENTION

Some embodiments of the present invention provide methods for automatically creating a social networking service (SNS) session including generating at and transmitting from a first device a first audio and/or video fingerprint of an audio and/or video event. The first audio and/or video fingerprint has a first predetermined length (T). A second audio and/or video fingerprint is periodically transmitted to a server from the first device. The second audio and/or video fingerprint has a second predetermined length (t), smaller than the first predetermined length (T), and includes data associated with the audio and/or video event that is later in time than data included in the first audio and/or video fingerprint. The first device is joined to an SNS session, automatically created by the server, responsive to receipt, at the server, of a third audio and/or video fingerprint having the first predetermined length (T) from a second device that includes a portion of the first audio and/or video fingerprint or the second audio and/or video fingerprint periodically transmitted from the first device.

In further embodiments of the present invention, the second device may be configured to generate the third audio and/or video fingerprint and periodically transmit a fourth audio and/or video fingerprint having the second predetermined length (t) to the server. The fourth audio and/or video fingerprint may include data associated with the audio and/or video event that is later in time than data included in the third audio and/or video fingerprint. A fifth audio and/or video fingerprint having the first predetermined length (T) may be received at the server from a third device. The third device may be joined to the SNS session if it is determined that the fifth audio and/or video fingerprint having the first predetermined length (T) from the third device includes the second audio and/or video fingerprint, a portion of the third audio and/or video fingerprint, or the forth audio and/or video fingerprint.

In still further embodiments of the present invention, an indication from the server may be received at the first device or the second device to terminate periodic transmission of the second or fourth audio and/or video fingerprint responsive to joining the third device to the SNS session. In certain embodiments of the present invention, an indication may be received from the server at the first device or the second device to reinstate periodically transmitting the second or fourth audio and/or video fingerprint to the server responsive to termination of the SNS session at the third device.

In some embodiments of the present invention, the first, second, third, fourth and fifth audio and/or video fingerprints may be compared at the server using statistical methods to determine if the first, second, third, fourth and/or fifth audio and/or video fingerprints are associated with a same audio and/or video event. In certain embodiments of the present invention, comparing may include adapting a comparison algorithm to allow for time shifting.

In further embodiments of the present invention, the generated first audio and/or video fingerprint may be processed at the first device to provide an improved first audio and/or video fingerprint of an audio and/or video event having the first predetermined length (T).

In still further embodiments of the present invention, the SNS session may include an online chat session, an online forum, an online bulletin board or an instant messaging session.

Although some embodiments of the present invention have been discussed above primarily with respect to method embodiments, device, systems and computer program products are also provided.

DETAILED DESCRIPTION OF EMBODIMENTS OF THE INVENTION

Figure 1:
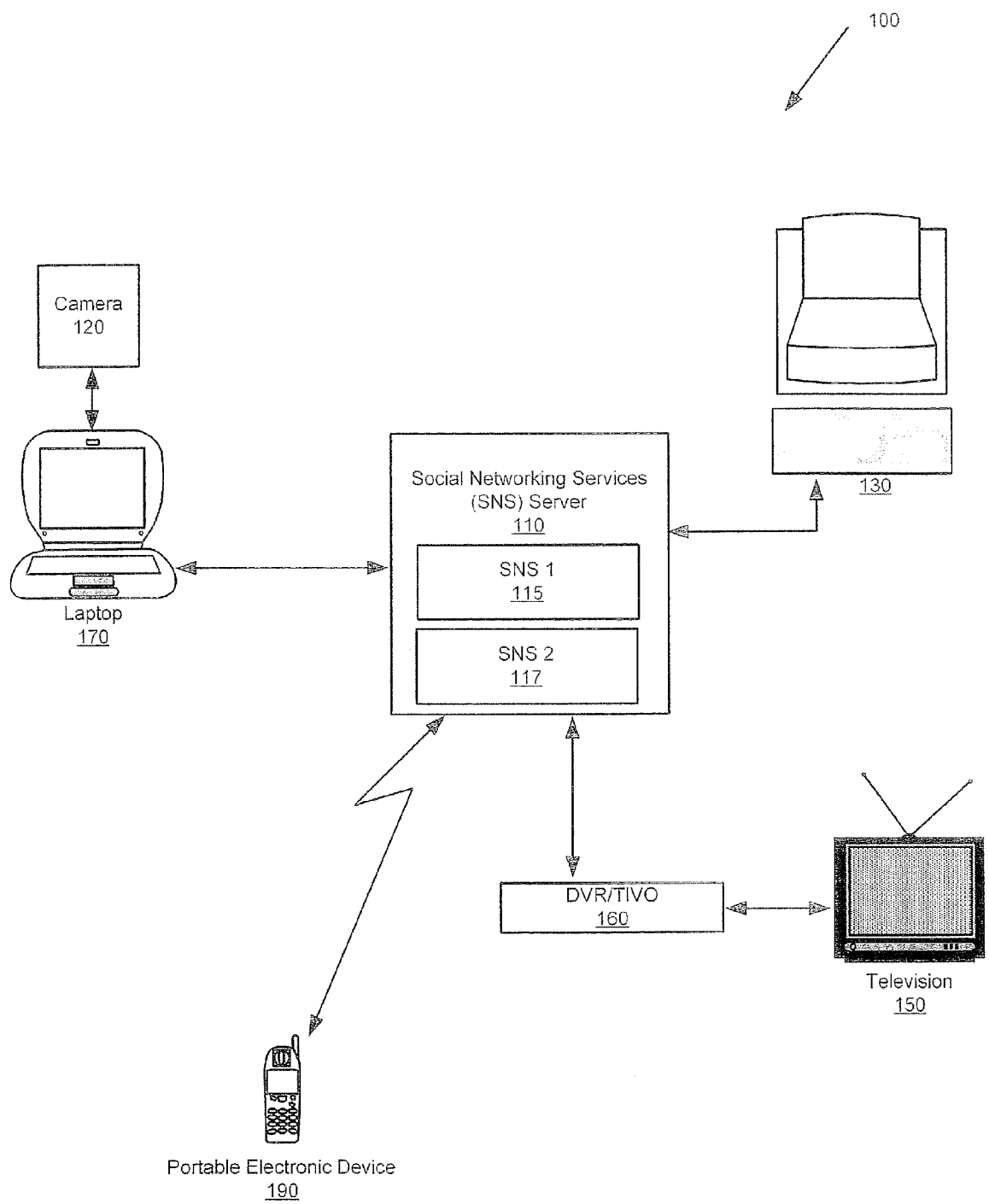
FIG. 1 is a schematic block diagram illustrating a network including a social networking services (SNS) server and devices associated therewith according to some embodiments of the present invention.

The present invention will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Example embodiments are described below with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

For purposes of illustration and explanation only, various embodiments of the present invention are described herein in the context of a portable electronic device, specifically a mobile terminal. It will be understood, however, that the present invention is not limited to such embodiments and may be embodied generally in any device that is capable of performing operations in accordance with some embodiments of the present invention.

Social networking services (SNSs), for example, online chat rooms, internet forums and bulletin boards, instant messaging and the like, have become increasingly prevalent. SNSs such as these enable people having similar interests, for example, sports, music, babies, politics and the like, to rendezvous in virtual communities. Typically, a user creates the virtual community, for example, an online chat room or bulletin board, and defines the context of the virtual community, for example, rock music. Virtual communities may also be set up to discuss ongoing events, for example, concerts, television, shows, sporting events and the like. In particular, a user can set up an online chat room to discuss an ongoing football game, or create an online forum where people can comment on a beauty contest currently being shown on television. Thus, the emergence of virtual communities may allow users to communicate with others having like interests without leaving the comfort of their home, office or the like.

Conventional SNSs typically require someone to take the initiative to create the virtual community associated with a particular topic and others, who may be interested in this topic (potential participants for the virtual community) need to discover or become aware of the virtual community. Thus, if the creator of the virtual community would like to discuss an ongoing event with a limited time window, for example, a concert or a television show, potential participants may not be aware of the created virtual community until after the event is over, obviating the need for the virtual community associated with the event altogether.

Accordingly, some embodiments of the present invention provide methods, devices, systems and computer program products for automatically creating SNSs. In particular, a virtual community associated with some type of audio/visual broadcast/event having a limited time window may be created automatically for users consuming the same audio/visual content simultaneously as will be discussed in detail below. Thus, some embodiments of the present invention may allow users to participate in the virtual community about an event having a limited time window before the event terminates.

Some embodiments of the present invention will now be discussed with respect to FIGS. 1 through 5. Referring first to FIG. 1, some embodiments of the present invention provide a network 100 including an SNS server 110 and multiple devices configured to communicate therewith. As illustrated in FIG. 1, the devices in the network 100 configured to communicate with the sever 10 include a personal computer 130, a television 150, a DVR/TIVO 160, a laptop 170, which is associated with a camera 120, and a portable electronic device 190. The camera 120 may be within the laptop 170 or separate from the laptop 170 without departing from the scope of the present invention. The devices 130, 150, 160, 170 and 190 can communicate with the server over a wire line or wirelessly without departing from the scope of the present invention. Although embodiments of the present invention illustrated in FIG. 1 include a personal computer 130, a television 150, a DVR/TIVO 160, a laptop 170 and a portable electronic device 190 all of which communicate with the server 110, embodiments of the present invention are not limited to this configuration. Any device having the capability to participate in SNS sessions and record audio and/or video and provide the recorded audio and/or video to the server 110 is within the scope of the present invention. Furthermore, although the devices in FIG. 1 are illustrated as being coupled to the server, the devices may also be coupled to one or more of the other devices without departing from the scope of the present invention.

As used herein, the term "portable electronic device" includes: a cellular radiotelephone with or without a multi-line display; a Personal Communications System (PCS) terminal that combines a cellular radiotelephone with data processing, facsimile and data communications capabilities; a Personal Data Assistant (PDA) that includes a radiotelephone, pager, Internet/intranet access, Web browser, organizer, calendar and/or a global positioning system (GPS) receiver; a gaming device, an audio video player, and a conventional laptop and/or palmtop portable computer that includes a radiotelephone transceiver. Any portable electronic device capable of operating in accordance with some embodiments of the present invention may be used without departing from the scope of the present invention.

As further illustrated in FIG. 1, the server 110 includes one or more SNS sessions SNS 1 115 and SNS 2 117. Although the server 110 is illustrated as running two SNS sessions, the server may run one or more than two sessions without departing from the scope of the present invention. Furthermore, although only a single server 110 is illustrated in FIG. 1, embodiments of the present invention may include two or more servers 110 without departing from the scope of the present invention.

Operations according to some embodiments of the present invention will be discussed with respect to the system 100 of FIG. 1. In particular, a first device, for example, portable electronic device 190, generates a first audio and/or video fingerprint of an audio and/or video event, for example, a radio program the user of the first device is interested in and wants to chat with people who listen to the radio program. The generated first audio and/or video fingerprint has a first predetermined length (T), which may be about 60 seconds in some embodiments of the present invention. The first device 190 transmits the first audio and/or video fingerprint to the server 110. In some embodiments of the present invention, after transmitting the first audio and/or video fingerprint to the server 110 initially, the first device 190 periodically transmits a second audio and/or video fingerprint having a second predetermined length (t), smaller than the first predetermined length (T), which may be about 5 seconds or long enough to secure identification. The second audio and/or video fingerprint includes different data associated with the audio and/or video event that is later in time than data included in the first audio and/or video fingerprint.

In particular, the periodic transmission of the audio and/or video fingerprints of length (t) contain different data than the initial transmission (length T). The fingerprints reflect live capture of audio/video associated with the event and change over time. Transmission of a smaller fingerprint of length (t) may preserve power. The first device 190 transmits the second audio and/or video fingerprint with a periodicity equal to the first predetermined length (T), which will be discussed further below with respect to FIG. 3.

The server 110 receives the first or second audio and/or video fingerprint from the first device 190. The server 110 is configured to compare the first or second audio and/or video fingerprint to other audio and/or video fingerprints received from other devices, for example, devices 130, 150 and 170 of FIG. 1. If the server 110 determines that one of the other audio and/or video fingerprints received at the server 110 includes a portion of the first or the second audio and/or video fingerprint, the server 110 automatically creates an SNS session and joins the first device and the other device(s) thereto.

Thus as discussed above, some embodiments of the present invention may make it possible to, as opposed to conventional solutions, automatically create SNS sessions, for example, chat rooms and forums, for users that consume the same audio and/or video content simultaneously. In some embodiments of the present invention, users may be able to participate in the SNS session with only a single click, which may possibly increase the use of such services.

The example discussed above includes a radio program as the audio and/or video event. However, embodiments of the present invention are not limited to this configuration. The event can be any type of broadcasted, or synchronously streamed, audio/visual content without departing from the scope of the present invention. Examples include, but are not limited to, radio programs broadcasted over the air or the Internet, or TV programs broadcasted over DVB-H or the Internet.

Figure 2:
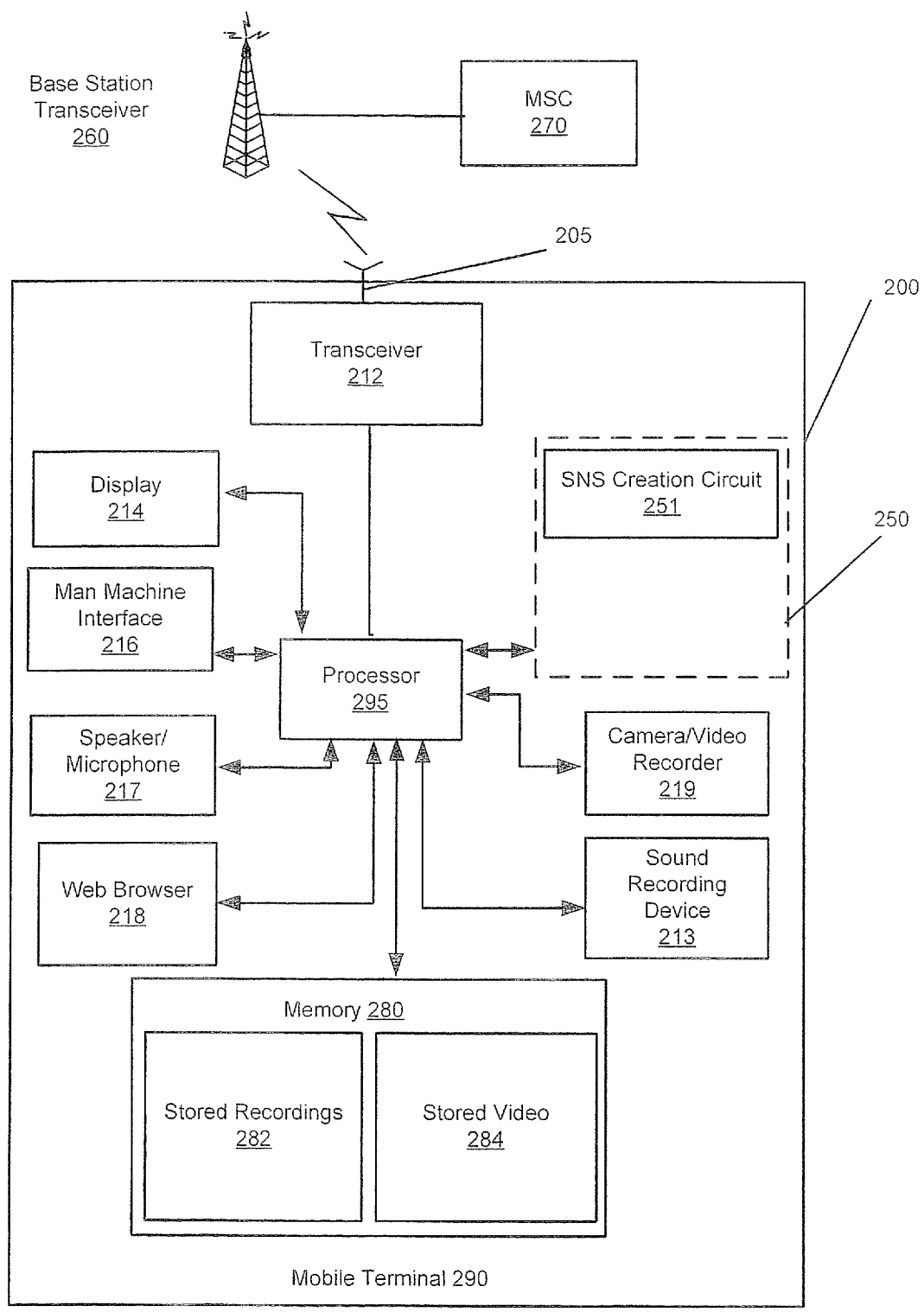
FIG. 2 is a schematic block diagram illustrating a portable electronic device and a cellular communication system in accordance with some embodiments of the present invention.

Furthermore, some embodiments of the present invention may provide users the ability to pick up the same audio/visual content by means provided by input devices, such as a microphone or a camera built into, or connected to, a portable electronic device as illustrated in FIG. 2, which will be discussed further below. Thus, embodiments of the present invention may also be used in situations like live concerts and sporting events without departing from the scope of the present invention.

As discussed above, embodiments of the present invention use audio/video recognition technology (audio/video fingerprinting) to identify users that want to participate in a SNS session pertaining to a certain event, for example, the radio program discussed above. Audio fingerprinting is known to those having skill in the art and can be used for both static media files, such as MP3-files, and real time broadcasts, such as to collect royalties. Accordingly, details of audio/video fingerprinting are not discussed in herein in the interest of brevity.

Referring now to FIG. 2, details with respect to some embodiments devices capable of communicating with a server in accordance with some embodiments of the present invention will be discussed. Specifically, portable electronic device 190 of FIG. 1 will be discussed with respect to the mobile terminal of FIG. 2. It will be understood that the discussion of the mobile terminal of FIG. 2 is provided for exemplary purposes only and, therefore, embodiments of the present invention are not limited to this configuration.

As illustrated in FIG. 2, the portable electronic device 290 includes a portable housing 200 and may include a display 214, a man machine interface (MMI) 216, a speaker/microphone 217, a web browser 218, a transceiver 212 and a memory 280, any of which may communicate with a processor 295. Furthermore, portable electronic devices 290 according to embodiments of the present invention may further include an SNS circuit 250, a camera/video recorder 219 and a sound recording device 213 according to some embodiments of the present invention, which also communicates with the processor 295. The processor 295 can be any commercially available or custom microprocessor.

As further illustrated in FIG. 2, the portable electronic device 290 communicates with a base station transceiver 260 connected to a mobile switching center ("MSC") 270 in accordance with some embodiments of the present invention. The transceiver 212 typically includes a transmitter circuit and a receiver circuit, which respectively transmit outgoing radio frequency signals to the base station transceiver 260 and receive incoming radio frequency signals, such as voice and data signals, from the base station transceiver 260 via an antenna 205. The antenna 205 may be an embedded antenna, a retractable antenna or any antenna known to those having skill in the art without departing from the scope of the present invention. The radio frequency signals transmitted between the portable electronic device 290 and the base station transceiver 260 may include both traffic and control signals (e.g., paging signals/messages for incoming calls), which are used to establish and maintain communication with another party or destination. The processor 295 may support various functions of the portable electronic device, including a SNS Circuit 250 configured to obtain the audio and/or video fingerprint of the event and provide the same to the server (110 FIG. 1) as discussed above according to some embodiments of the present invention as will be discussed further herein.

It will be understood that in some embodiments of the present invention, the transceiver 212 may be a short range transceiver. The short range transceiver may be, for example, a Bluetooth transceiver, which may allow for high transfer rates of data over relatively short distances. It will be further understood that portable electronic devices 290 according to some embodiments of the present invention may include a wireless transceiver and a short range transceiver/transmitter.

In some embodiments of the present invention, the base station transceiver 260 includes the radio transceiver(s) that defines an individual cell in a cellular network and communicates with the portable electronic device 290 and other portable electronic devices in the cell using a radio-link protocol. Although only a single base station transceiver 260 is shown, it will be understood that many base station transceivers may be connected through, for example, a mobile switching center 270 and other devices to define a wireless communications network.

Although the present invention may be embodied in communication devices or systems, such as the portable electronic device 290, the present invention is not limited to such devices and/or systems. Instead, the present invention may be embodied in any apparatus that may be configured to operate in accordance with some embodiments of the present invention.

Figure 3:
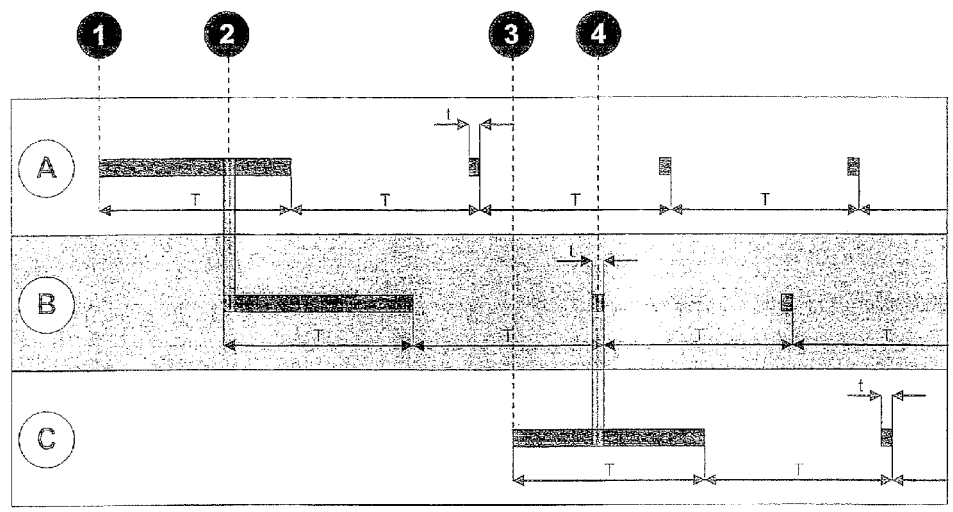
FIG. 3 is a diagram illustrating transmission and receipt of audio/video fingerprints at a server in accordance with some embodiments of the present invention.

As further illustrated in FIG. 2, the SNS circuit 250 includes an SNS Creation circuit 251. Although a single circuit is illustrated in FIG. 3, it will be understood that this circuit/module can be split into multiple circuits/modules without departing from the scope of the present invention.

In particular, the SNS creation circuit 251 is configured to initiate generation of a first audio and/or video fingerprint of an audio and/or video event. The first audio and/or video fingerprint has a first predetermined length (T). The SNS creation circuit 251 is configured to store the first audio and/or video fingerprint in the memory 280 in the stored recordings 282 or the stored video 284. In particular, the user of the portable electronic device 290 may acquire the audio and/or video event using, for example, the microphone 217 and the sound recording device or the camera/video recorder 219. Once the audio and/or video event is acquired, the SNS creation circuit 251 may initiate generation of the audio and/or video fingerprint and store the same in memory 280.

The SNS creation circuit 251 may be further configured to initiate transmission of the first audio and/or video fingerprint to the server as well as periodic transmissions of a second audio and/or video fingerprint to a server (110 FIG. 1). As discussed above, the second audio and/or video fingerprint may have a second predetermined length (t), smaller than the first predetermined length (T) and may include different data associated with the audio and/or video event that is later in time than data included in the first audio and/or video fingerprint. Sending a smaller fingerprint after the initial transmission may preserve power in the device.

As discussed above, the portable electronic device 290 may be joined to the SNS session automatically created by the server responsive to receipt, at the server, of a third audio and/or video fingerprint having the first predetermined length (T) from a second device that includes a portion of the first audio and/or video fingerprint or the second audio and/or video fingerprint.

Details in accordance with some embodiments of the present invention will now be discussed with respect to FIGS. 1 through 3. A first user (User A of FIG. 3) of a first device may be listening to a radio show he/she finds interesting and wants to chat with other people who listen to the program. The SNS creation circuit 251 of the first device 290 initiates generation of an audio fingerprint of length T, for example, 60 seconds, using the sound recording device. The audio fingerprint of length T may be stored in the memory 280 at stored recordings 282. The audio fingerprint of length T is sent to the server 110 (number 1 of FIG. 3) and stored in, for example, SNS 1 115. In order to preserve power, after initial transmission of the audio fingerprint of length T, the SNS creation circuit 251 may initiate sending a second audio fingerprint of length t that is long enough to secure identification, for example, 5 seconds. The second audio fingerprint may include different data than the first audio fingerprint that is later in time than data included in the first audio fingerprint. The second audio fingerprint may be sent with a periodicity of T after the initial fingerprint is transmitted as illustrated in FIG. 3.

Referring now to process number 2 of FIG. 3, a second user (User B) of a second device may also want to chat about the same radio program. The second device may also generate a third audio fingerprint of length T and send the third audio fingerprint to the server 110 as discussed with respect to the first device 290. The server 110 is configured to compare the audio fingerprints provided by User A and User B. A comparison of length t may be sufficient in accordance with some embodiments of the present invention. If the server 110 determines that audio fingerprints match, the server 110 automatically creates a chat session and joins users A and B to the chat session.

The second device may also be configured to periodically send a fourth audio fingerprint of length (t), smaller than length (T) of the third audio fingerprint. The fourth audio fingerprint may include different data associated with the radio program that is later in time than data included in the third audio fingerprint.

As further illustrated by process number 3 of FIG. 3, at some point later in time, a third user (User C) also wants to join the chat session associated with the radio program and generates a fifth audio fingerprint of length T and transmits it to the server 110. As discussed above, users A and B only periodically send audio fingerprints of length (t), when the server 110 receives the fifth audio fingerprint, the server 110 waits until another user's fingerprint of length t becomes available. This will happen since users A and B send fingerprints of length t with the periodicity of T.

Referring to process number 4 of FIG. 3, user B's fingerprint of length t is sent to the server 110. The server 110 compares the fifth audio fingerprint associated with User C to fourth audio fingerprint sent by user B and determines that they match. Responsive to the comparison match, user C is joined to the chat session. Users A, B and C are now in the same chat session.

In some embodiments of the present invention, in order to save additional battery power, some of the devices participating the SNS session may be instructed to stop sending fingerprints as new users are added to the chat. For example, it would be sufficient if one, such as the most recently added, device sends fingerprints. However, in these embodiments, it should also be possible to instruct devices participating in the SNS session to start sending the fingerprints again should the terminal currently sending the fingerprints terminate the SNS session.

Furthermore, when audio fingerprints are generated using, for example, a microphone in a live environment, such as a live concert, it is likely that the fingerprints will be of poorer quality compared to those generated from traditional broadcast signals. In order to improve performance in such case, a statistical approach, possibly complemented by fuzzy logic, where fingerprints from multiple devices are compared may be used. Furthermore, the signal may also be subject to additional signal processing at the time of fingerprint generation, which could also improve performance.

It will be understood that actual rendering, and thereby fingerprint generation, of a program may be subject to delays of varying degree when transmitted using different transmission technologies. The delay usually becomes evident when digital transmission is used, for example, DVB compared to traditional analog TV. In order to address this, the fingerprinting matching algorithm in accordance with some embodiments of the present invention may allow for some time shifting.

Although the example discussed above refers to a radio program, other types of events may also be used. For example, a TV program can also be identified in the same manner by only producing fingerprints on the audio part. Furthermore, video fingerprinting may also be used by itself or in combination with audio fingerprinting without departing from the scope of the present invention.

Figure 4:
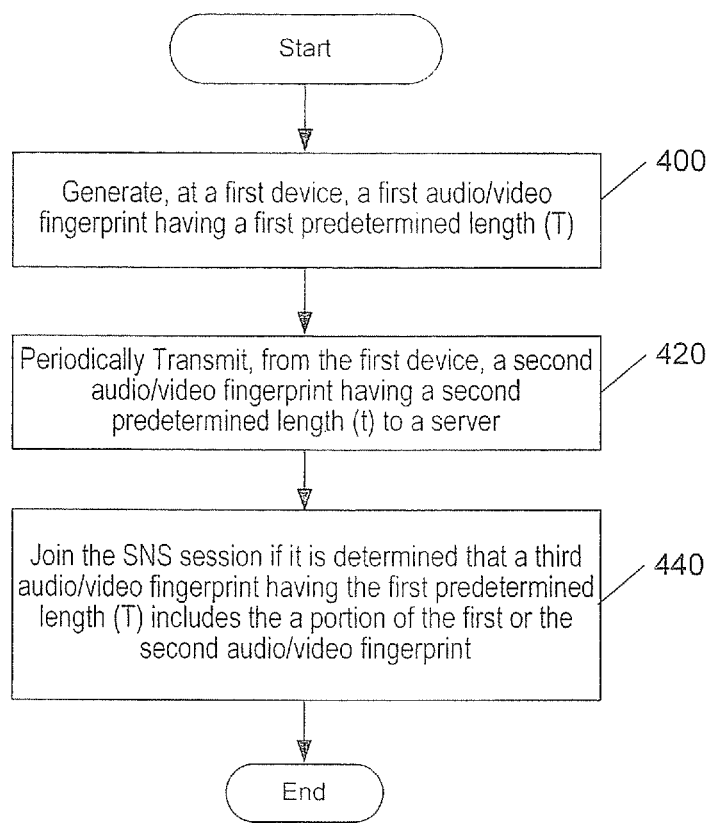
FIGS. 4 and 5 are flowcharts illustrating methods according to various embodiments of the present invention.
Figure 5:
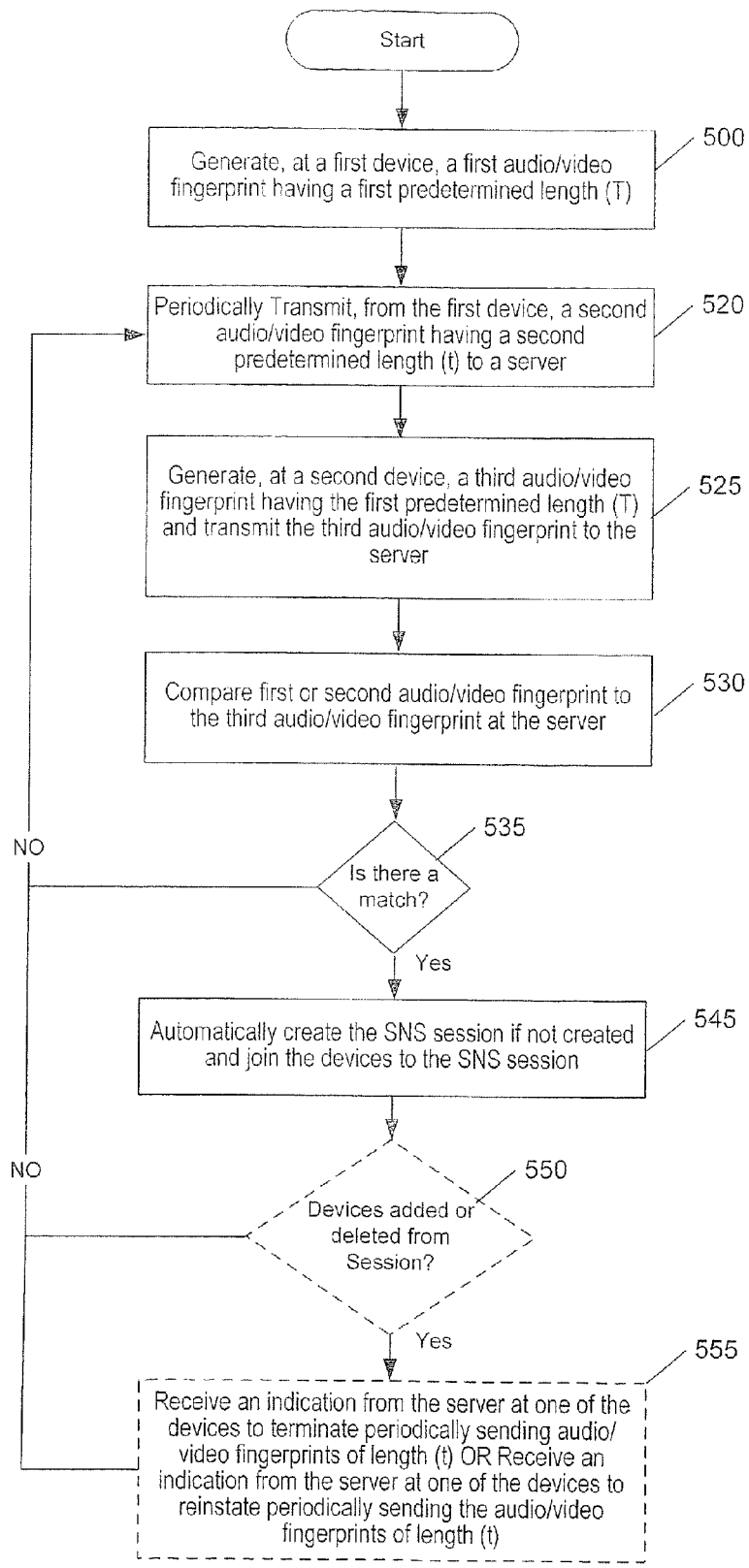

Referring now to FIGS. 4 and 5, operations according to various embodiments of the present invention will be discussed. Referring first to FIG. 4, operations for automatically creating a social networking service (SNS) session begin at block 400 by generating at and transmitting from a first device a first audio and/or video fingerprint of an audio and/or video event. As discussed above, the first audio and/or video fingerprint has a first predetermined length (T), for example, 60 seconds. For example, an audio and/or video fingerprint of a television show may be generated at a first device and the audio and/or video fingerprint having the first predetermined length (T) may be sent to a server. The first device may then periodically transmit a second audio and/or video fingerprint to a server (block 420). The second audio and/or video fingerprint may have a second predetermined length (t), smaller than the first predetermined length (T), and may include different data associated with the audio and/or video event that is later in time than data included in the first audio and/or video fingerprint. Thus, the later fingerprint transmissions (of length t) contain different data than the initial transmission (length T) for each device. The fingerprints reflect live capture of audio/video and change over time. The second predetermined length may be just long enough to secure identification, for example, 5 seconds. The smaller fingerprint may be sent to conserve power. The first device may join the SNS session that is automatically created by the server responsive to receipt, at the server, of a third audio and/or video fingerprint having the first predetermined length (T) from a second device that includes a portion of the first or the second audio and/or video fingerprint (block 440).

Referring now to FIG. 5, operations according to various embodiments of the present invention will be discussed. Dotted lines in FIG. 5 depict optional elements. As illustrated in FIG. 5, operations for automatically creating a social networking service (SNS) session begin at block 500 by generating at and transmitting from a first device a first audio and/or video fingerprint of an audio and/or video event. The SNS session may be, for example, an online chat session, an online forum, an online bulletin board, an instant messaging session or the like.

As discussed above, the first audio and/or video fingerprint having a first predetermined length (T), for example, 60 seconds. For example, an audio and/or video fingerprint of a television show may be generated at a first device and the audio and/or video fingerprint having the first predetermined length (T) may be sent to a server. The first device may then periodically transmit a second audio and/or video fingerprint to a server (block 520). The second audio and/or video fingerprint may have a second predetermined length (t), smaller than the first predetermined length (T), and include different data associated with the audio and/or video event that is later in time than data included in the first audio and/or video fingerprint. The second predetermined length may be just long enough to secure identification, for example, 5 seconds. The smaller fingerprint may be sent to conserve power.

In some embodiments of the present invention, the generated audio and/or video fingerprint may be processed at the first device to provide an improved first audio and/or video fingerprint of an audio and/or video event having the first predetermined length (T).

A second device may generate at and transmit from the device a third audio and/or video fingerprint of an audio and/or video event (block 525). The second audio and/or video fingerprint has a first predetermined length (T), for example, 60 seconds. A portion of the first or the second audio and/or video fingerprint may be compared to the third audio and/or video fingerprint at the server (530). If it is determined that there is a match (block 535), operations proceed to block 545 where the server automatically creates the SNS session and joins to first and second device to the SNS session.

If, on the other hand, it is determined that there is no match (block 535), operations return to block 520 and repeat until a match is obtained (block 535). It will be understood that operations of block 520 can be associated with any of the devices that have been joined in the SNS session. Thus, after transmitting an audio and/or video fingerprint having the first predetermined length (T), devices joined to the SNS session each periodically transmit a smaller audio and/or video fingerprint having the second predetermined length (t) to conserve power (block 520). Thus, the second device may be configured to periodically transmit a fourth audio and/or video fingerprint having a length (t) to the server after initial transmission of the third audio and/or video fingerprint.

In particular, when operations return to block 520 a fifth audio and/or video fingerprint having the first predetermined length (T) may be received at the server from a third device. The third device may be joined to the existing SNS session if it is determined that the fifth audio and/or video fingerprint having the first predetermined length (T) from the third device includes the second, a portion of the third or the fourth audio and/or video fingerprint.

As discussed above, in some embodiments of the present invention fewer than all of the devices joined to the SNS session may send the periodic transmission of length (t) at block 525. In these embodiments, an indication from the server may be received at the device that is being instructed to terminate periodic transmissions to terminate periodic transmission of the audio and/or video fingerprint of length (t). This instruction may be sent from the server responsive to the addition of a new device to the SNS session. In these embodiments, the server may also be configured to send an indication to a device that is not sending periodic transmissions to reinstate periodically transmitting the generated audio and/or video fingerprint of length (t) to the server. The server may send this request responsive to termination of the SNS session at one of the devices in the SNS session.

In particular, it may be determined at block 550 if a device has been added to or deleted from the SNS session. If it is determined that a device has been added (block 550), the server may send an indication to one or more devices joined to the SNS session to terminate periodic transmission of the audio and/or video fingerprint of length (t) (block 555). If, on the other hand, it is determined that a device has been removed from the SNS session (block 550), the server may send an indication to one or more devices to reinstate sending the periodic transmissions of the audio and/or video fingerprints of length (t) (block 555).

In some embodiments of the present invention, comparing at block 530 includes comparing the first, second, third, fourth and/or fifth audio and/or video fingerprints at the server using statistical methods to determine if the first, second, third, fourth and/or fifth audio and/or video fingerprints are associated with a same audio and/or video event. This comparison (block 530) may including adapting a comparison algorithm to allow for time shifting as discussed above with respect to FIG. 3.

In the drawings and specification, there have been disclosed exemplary embodiments of the invention. However, many variations and modifications can be made to these embodiments without substantially departing from the principles of the present invention. Accordingly, although specific terms are used, they are used in a generic and descriptive sense only and not for purposes of limitation, the scope of the invention being following claims.

That which is claimed:

1. A method for automatically creating a social networking service (SNS) session, comprising:
   generating at and transmitting from a first device a first audio and/or video fingerprint of an audio and/or video event, the first audio and/or video fingerprint having a first predetermined length (T);
   periodically transmitting, from the first device, a second audio and/or video fingerprint to a server, the second audio and/or video fingerprint having a second predetermined length (t), smaller than the first predetermined length (T), and including data associated with the audio and/or video event that is later in time than data included in the first audio and/or video fingerprint; and
   joining the SNS session automatically created by the server responsive to receipt, at the server, of a third audio and/or video fingerprint having the first predetermined length (T) from a second device that includes a portion of the first audio and/or video fingerprint or the second audio and/or video fingerprint periodically transmitted from the first device.

2. The method of claim 1, wherein the second device is configured to generate the third audio and/or video fingerprint and periodically transmit a fourth audio and/or video fingerprint having the second predetermined length (t) to the server, the fourth audio and/or video fingerprint including data associated with the audio and/or video event that is later in time than data included in the third audio and/or video fingerprint, the method further comprising:
   receiving, at the server, a fifth audio and/or video fingerprint having the first predetermined length (T) from a third device; and joining the third device to the SNS session if it is determined that the fifth audio and/or video fingerprint having the first predetermined length (T) from the third device includes the second audio and/or video fingerprint, a portion of the third audio and/or video fingerprint, or the forth audio and/or video fingerprint.

3. The method of claim 2, further comprising:
receiving an indication from the server at the first device or the second device to terminate periodic transmission of second or fourth audio and/or video fingerprint responsive to joining the third device to the SNS session.

4. The method of claim 3, further comprising:
receiving an indication, from the server, at the first device or the second device to reinstate periodically transmitting the second or fourth audio and/or video fingerprint to the server responsive to termination of the SNS session at the third device.

5. The method of claim 2, further comprising:
comparing, at the server, the first, second, third, fourth and/or fifth audio and/or video fingerprints using statistical methods to determine if the first, second third, fourth and/or fifth audio and/or video fingerprints are associated with a same audio and/or video event.

6. The method of claim 5, wherein comparing comprises adapting a comparison algorithm to allow for time shifting.

7. The method of claim 1, wherein generating is followed by processing the generated first audio and/or video fingerprint at the first device to provide an improved first audio and/or video fingerprint of an audio and/or video event having the first predetermined length (T).

8. The method of claim 1, wherein the SNS session comprises an online chat session, an online forum, an online bulletin board or an instant messaging session.

9. The method of claim 1 implemented by a portable electronic device.

10. The method of claim 1, wherein periodically transmitting comprises periodically transmitting the second audio and/or video fingerprint with a periodicity of T.

11. A system for automatically creating a social networking service session, comprising:
first and second devices, the first device being configured to generate a first audio and/or video fingerprint of an audio and/or video event at the first device and transmit the first audio and/or video fingerprint, the first audio and/or video fingerprint having a first predetermined length (T); and
a server configured to:
receive periodic transmissions of a second audio and/or video fingerprint from the first device, the second t audio and/or video fingerprint having a second predetermined length (t), smaller than the first predetermined length(T), and including data associated with the audio and/or video event that is later in time than data included in the first audio and/or video fingerprint;
compare a third audio and/or video fingerprint having the first predetermined length (T) from the second device to the first or second audio and/or video fingerprint generated at the first device;
automatically create the SNS session if it is determined that the third audio and/or video fingerprint having the first predetermined length (T) from the second device includes a portion of the first audio and/or video fingerprint or the second audio and/or video fingerprint periodically transmitted from the first device; and
join the first and second devices to the SNS session.

12. The system of claim 11, wherein the second device is configured to generate the third audio and/or video fingerprint and periodically transmit a fourth audio and/or video fingerprint having the second predetermined length (t) to the server, the fourth audio and/or video fingerprint including data associated with the audio and/or video event that is later in time than data included in the third audio and/or video fingerprint, the system further comprising:
a third device configured to generate a fifth audio and/or video fingerprint having the first predetermined length (T), wherein the server is configured to:
receive the fifth audio and/or video fingerprint having the first predetermined length (T) from the third device; and
join the third device to the SNS session if it is determined that the third audio and/or video fingerprint having the first predetermined length (T) from the third device includes the second audio and/or video fingerprint, a portion of the third audio and/or video fingerprint or the fourth audio and/or video fingerprint.

13. The system of claim 12, wherein the first device or the second device is further configured to receive an indication from the server to terminate periodic transmission of second or fourth audio and/or video fingerprint responsive to joining the third device to the SNS session.

14. The system of claim 13, wherein the first device or the second device is further configured to receive an indication from the server to reinstate periodically transmitting second or fourth audio and/or video fingerprint to the server responsive to termination of the SNS session at the third device.

15. The system of claim 12, wherein the server is configured to compare the first, second, third, fourth and/or fifth audio and/or video fingerprints using statistical methods to determine if the first, second, third fourth and/or fifth audio and/or video fingerprints are associated with a same audio and/or video event.

16. The system of claim 15, wherein the server is configured to adapt a comparison algorithm to allow for time shifting.

17. The system of claim 11, wherein the first device is further configured to process the generated first audio and/or video fingerprint at the first device to provide an improved first audio and/or video fingerprint of an audio and/or video event having the first predetermined length (T).

18. The system of claim 11, wherein the SNS session comprises an online chat session, an online forum, an online bulletin board or an instant messaging session.

19. The system of claim 11, wherein the server is further configured to a server configured to receive periodic transmissions of the second audio and/or video fingerprint from the first device with a periodicity of T.

20. A computer program product for automatically creating a social networking service (SNS) session, the computer program product comprising:
a non-transitory computer-readable storage medium having computer-readable program code embodied in said medium, said computer-readable program code comprising:
computer readable program code configured to generate at and transmit from a first device a first audio and/or video fingerprint of an audio and/or video event, the first audio and/or video fingerprint having a first predetermined length (T);
computer readable program code configured to periodically transmit, from the first device, a second audio and/or video fingerprint to a server, the second audio and/or video fingerprint having a second predetermined length (t), smaller than the first predetermined length (T), and including data associated with the audio and/or video event that is later in time than data included in the first audio and/or video fingerprint; and computer readable program code configured to join the SNS session automatically created by the server responsive to receipt, at the server, of a third audio and/or video fingerprint having the first predetermined length (T) from a second device that includes a portion of the first audio and/or video fingerprint or the second audio and/or video fingerprint periodically transmitted from the first device.

21. The computer program product of claim 20, wherein the second device is configured to generate the third audio and/or video fingerprint and periodically transmit a fourth audio and/or video fingerprint having the second predetermined length (t) to the server, the fourth audio and/or video fingerprint including data associated with the audio and/or video event that is later in time than data included in the third audio and/or video fingerprint, the compute program product further comprising:

computer readable program code configured to receive, at the server, a fifth audio and/or video fingerprint having the first predetermined length (T) from a third device; and computer readable program code configured to join the third device to the SNS session if it is determined that the fifth audio and/or video fingerprint having the first predetermined length (T) from the third device includes the second audio and/or video fingerprint, a portion of the third audio and/or video fingerprint, or the forth audio and/or video fingerprint.

22. The computer program product of claim 21, further comprising:

computer readable program code configured to receive an indication from the server at the first device or the second device to terminate periodic transmission of the second or fourth audio and/or video fingerprint responsive to joining the third device to the SNS session.

23. The computer program product of claim 22, further comprising:

computer readable program code configured to receive an indication, from the server at the first device or the second device, to reinstate periodically transmitting the second or fourth audio and/or video fingerprint to the server responsive to termination of the SNS session at the third device.

24. The computer program product of claim 21, further comprising:

computer readable program code configured to compare at the server, the first, second, third, fourth and/or fifth audio and/or video fingerprints using statistical methods to determine if the first, second, third, fourth and/or fifth audio and/or video fingerprints are associated with a same audio and/or video event.

25. The computer program product of claim 24, further comprising computer readable program code configured to adapt a comparison algorithm to allow for time shifting.

26. The computer program product of claim 21, further comprising processing the generated first audio and/or video fingerprint at the first device to provide an improved first audio and/or video fingerprint of an audio and/or video event having the first predetermined length (T).

27. The computer program product of claim 21, wherein the SNS session comprises an online chat session, an online forum, an online bulletin board or an instant messaging session.

28. The computer program product of claim 20, wherein the computer readable program code configured to periodically transmit comprises computer readable program code configured to periodically transmit the second audio and/or video fingerprint with a periodicity of T.

* * * * *

UNITED STATES PATENT AND TRADEMARK OFFICE
CERTIFICATE OF CORRECTION

| | | |
|---|---|---|
| PATENT NO. | : 8,806,021 B2 | Page 1 of 1 |
| APPLICATION NO. | : 12/020905 | |
| DATED | : August 12, 2014 | |
| INVENTOR(S) | : Larsson et al. | |

It is certified that error appears in the above-identified patent and that said Letters Patent is hereby corrected as shown below:

On Title Page:
Item (57), Abstract, Line 15: Reads "to receipts at the server,"
                       Should read -- to receipt, at the server, --

Signed and Sealed this
Sixteenth Day of December, 2014

Michelle K. Lee
*Deputy Director of the United States Patent and Trademark Office*